UNITED STATES PATENT OFFICE.

WILLIAM P. HAMLIN, OF ROGERS, ARKANSAS.

MANUFACTURE OF WINE.

SPECIFICATION forming part of Letters Patent No. 412,385, dated October 8, 1889.

Application filed June 12, 1889. Serial No. 313,990. (No specimens.)

*To all whom it may concern:*

Be it known that I, WILLIAM P. HAMLIN, a citizen of the United States, residing at Rogers, in the county of Benton and State of Arkansas, have invented a new and useful Improvement in the Manufacture of Wine, of which the following is a specification.

This invention has relation to the manufacture of wines, and among the objects in view are to provide a light sweet wine, the principal ingredient of which will be sweet cider or other fruit-juice, whereby the wine is capable of being produced at a minimum cost, and that in a simple manner, all as will hereinafter appear.

The invention consists in the manufacture of the wine from the following ingredients and in a manner which I will describe in the steps in which the method takes place.

The proportions hereinafter specified may be varied without departing from the spirit of my invention, as may also some of the steps of the method; but those herein stated I have found by experience as resulting to the greatest advantage.

The following is a description of my invention in detail: I take about four gallons of sweet cider, or, it may be, the juice of any berry or fruit, and pour the same in an open vessel, stirring into it one pound of, preferably, wheat-bran, and cover the vessel with a series of thick cloths, letting it stand about twenty-four hours after the bran has disappeared from the top and settled to the bottom. I then strain and press all of the cider or juice from the bran and return the juice to the vessel and add to the liquid about sixteen pounds of, preferably, loaf sugar, which causes it to undergo a second violent fermentation. The vessel is now covered as before, and carefully skimmed at least once a day until all the sediment stops rising to the top.

The liquid is then poured into a tight vessel provided with a small gimlet-hole for the escape of gas, and ventilation, and set aside in a cool place for about six weeks, thus undergoing a quiet fermentation, after which the wine is ready for use.

By my invention I secure a very cheap, wholesome, sweet, and well-flavored wine, which I materially cause in the latter instances by reason of subjecting it during its manufacture to two violent fermentations in a short period of time—say twenty days.

The bran counteracts all vinegar or wood flavor that is naturally contained in the juice or cider as it ages, and forms instead a splendid spirit, mildly flavored, pure, and wholesome.

Having described my invention, what I claim is—

1. The herein-described method of manufacturing wine from the juices of fruits, consisting in adding to the juice bran, subjecting the same to the action of the bran for a period of time, then separating the juice from the bran and sweetening, next skimming and allowing the same to stand, as specified.

2. The herein-described method of manufacturing wine from the juices of fruits, consisting in adding to the juice wheat-bran, subjecting the same to the action of the bran, separating the juice by straining from the bran, sweetening, skimming, and next setting aside for fermentation, these steps being performed in the order named and in the manner described, as specified.

In testimony that I claim the foregoing as my own I have hereto affixed my signature in presence of two witnesses.

WILLIAM P. HAMLIN.

Witnesses:
W. J. PRICE,
J. SIKES.